June 2, 1931.  A. C. McKISSOCK  1,808,116
TILE LINOLEUM
Filed June 3, 1929
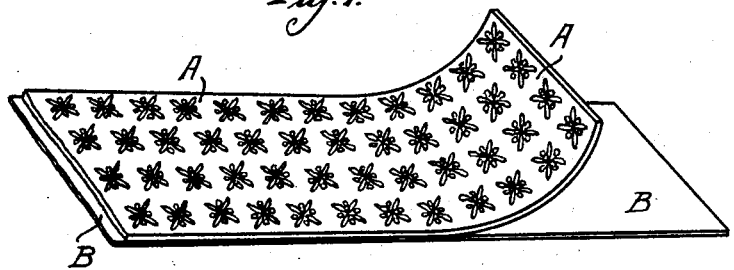
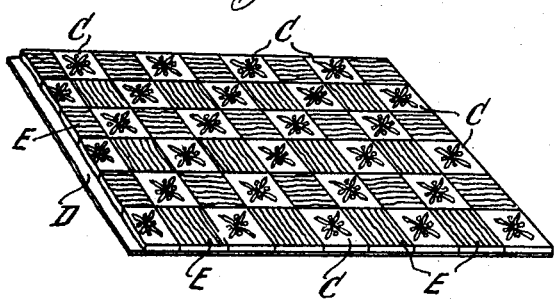
Inventor:
Alexander C. McKissock;
By His Attorneys,
Baldwin & Wight Patented June 2, 1931

1,808,116

UNITED STATES PATENT OFFICE

ALEXANDER CATHIE McKISSOCK, OF LONDON, ENGLAND, ASSIGNOR TO LINOLEUM MANUFACTURING COMPANY, LIMITED, OF LONDON, ENGLAND

TILE LINOLEUM

Application filed June 3, 1929, Serial No. 367,927, and in Great Britain April 19, 1929.

This invention relates to improvements in tile linoleum and like products.

The object of the present invention is to enrich a tile pattern linoleum with pieces cut from a patterned linoleum.

According to the present invention, an enriched tile pattern linoleum is produced by making a patterned linoleum on a backing, stripping the patterned linoleum from the backing, cutting it into pieces to form patterned tesserae or tiles, laying them on to a backing together with plain, marbled, grained or other suitable tiles or tesserae cut from sheets in the usual manner, and consolidating the whole by pressure or in any other suitable manner.

The invention is illustrated in the accompanying diagrammatic views in which Figure 1 shows a patterned linoleum A being stripped from its backing B. The linoleum A after being stripped is cut into pieces to form tesserae or tiles C and placed as shown in Figure 2, on to a backing D together with plain, marbled, grained or other suitable tiles E cut from sheets in the usual manner.

The enriched tile pattern linoleum shown in Figure 2 is then consolidated in the usual manner by pressure or in any other suitable manner.

The patterned linoleum shown in Figure 1 may be made in any suitable manner, for example, by depositing, on a backing, granulated material of different colours in their proper place to form the desired pattern, and consolidating the product by pressure, or by printing the desired pattern on linoleum material carried by a backing.

What I claim is:—

The method of producing an enriched tile pattern linoleum which consists in stripping a patterned linoleum from its backing, cutting the stripped linoleum into tesserae each containing a pattern, cutting tesserae to be enriched by the first mentioned tesserae from other linoleum, and in combining the first and second tesserae in substantially checkered relation on a backing and into the final product.

In testimony that I claim the foregoing as my invention I have signed my name this 17th day of May, 1929.

ALEXANDER CATHIE McKISSOCK.